(12) United States Patent
Goel

(10) Patent No.: US 8,429,514 B1
(45) Date of Patent: Apr. 23, 2013

(54) DYNAMIC LOAD BALANCING OF DISTRIBUTED PARITY IN A RAID ARRAY

(75) Inventor: Atul Goel, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1217 days.

(21) Appl. No.: 12/237,138

(22) Filed: Sep. 24, 2008

(51) Int. Cl.
*G11C 29/42* (2006.01)
*G11C 29/56* (2006.01)

(52) U.S. Cl.
USPC .......................................... 714/805; 714/758

(58) Field of Classification Search .................... None
See application file for complete search history.

(56) References Cited

U.S. PATENT DOCUMENTS

| 5,390,327 | A | * | 2/1995 | Lubbers et al. .............. 714/6.32 |
| 2003/0115412 | A1 | * | 6/2003 | Franklin et al. ............... 711/114 |
| 2005/0097270 | A1 | * | 5/2005 | Kleiman et al. ............... 711/114 |
| 2005/0114594 | A1 | * | 5/2005 | Corbett et al. ................ 711/114 |

* cited by examiner

*Primary Examiner* — Albert Decady
*Assistant Examiner* — Dipakkumar Gandhi
(74) *Attorney, Agent, or Firm* — Blakely, Sokoloff, Taylor & Zafman LLP

(57) ABSTRACT

A parity pattern defines a repeated distribution of parity blocks within a distributed parity disk array ("DPDA"). The parity pattern identifies on which disks the parity block or blocks for a stripe are located. When a new disk is added to the DPDA, the parity pattern is modified so that the distribution of parity blocks within the parity pattern is even. Parity blocks within the DPDA are then redistributed to conform with the modified parity pattern.

12 Claims, 5 Drawing Sheets

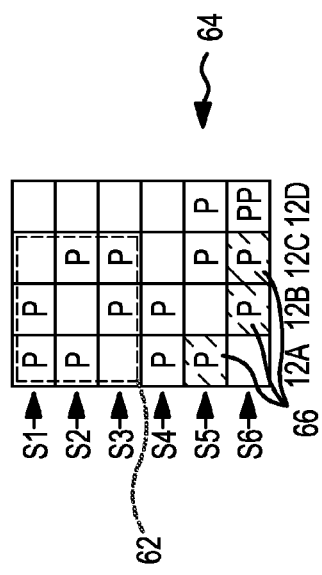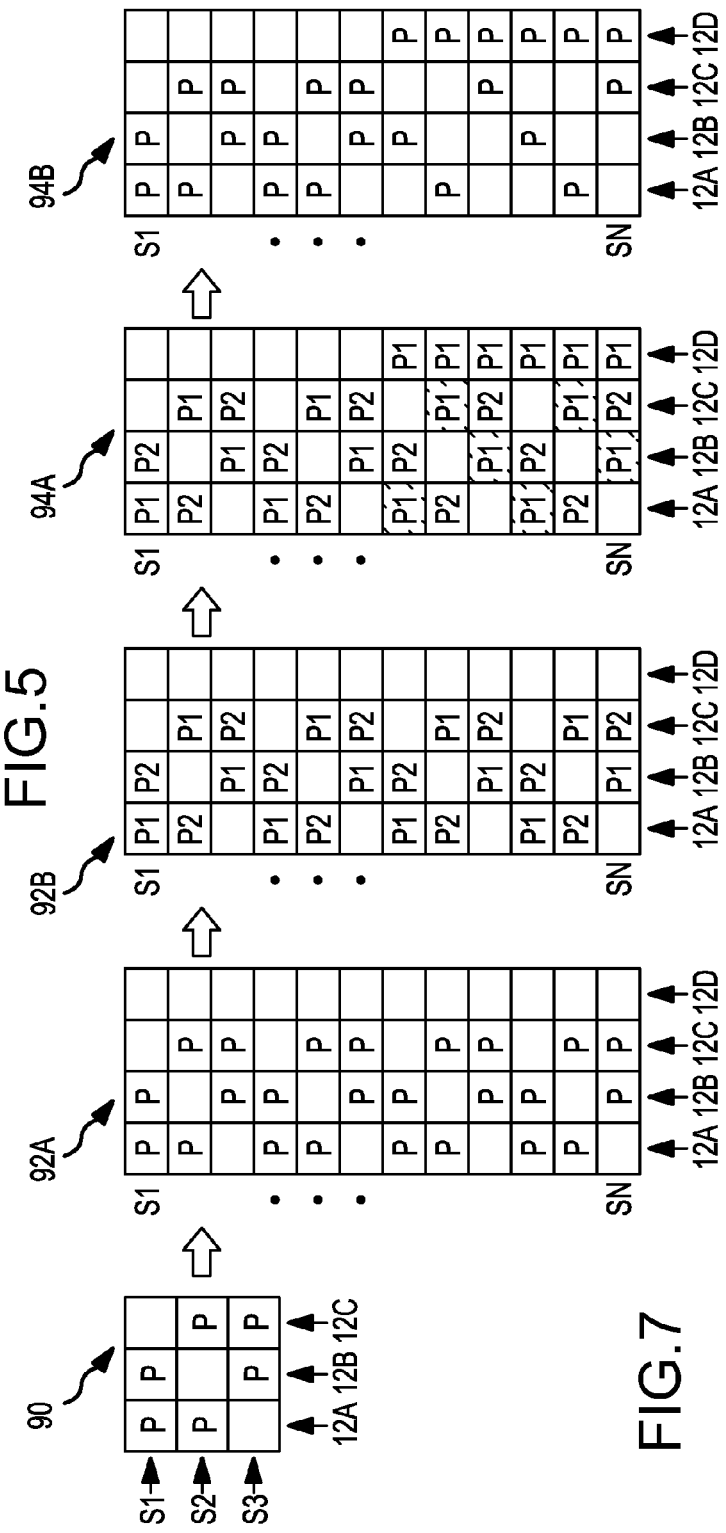
FIG. 5
FIG. 7

DYNAMIC LOAD BALANCING OF DISTRIBUTED PARITY IN A RAID ARRAY

This invention relates to distributed parity disk arrays and data storage computers. More particularly, the present invention relates to a new and improved method and apparatus for dynamically reallocating parity information across a distributed parity disk array when a new disk is added to the disk array.

BACKGROUND OF THE INVENTION

Hard disk drives ("disks") are common data storage devices used in conjunction with computers. Computers typically store data either on locally attached disks or on a remote data storage server computer which has its own locally attached disks. Disks, like other electronic devices, are prone to occasional failures which can result in a loss of access to the data on the disk. A technique for protecting data against the failure of a disk is to combine several disks into a Redundant Array of Inexpensive (or Independent) Disks (RAID).

RAID levels define a relationship between data and disks. A collection of disks which implement a RAID level is conventionally referred to as a RAID array. Different RAID levels may involve mirroring data between disks, striping data across disks, or striping data and parity information across disks. RAID arrays of RAID levels 3, 4 and 5 involve striping data across all of the disks of the array, which may contain many thousands of equally sized stripes, and also involves storing parity information in the array. Each disk contributes the same amount of storage space for a particular stripe, referred to as a block. The size of a block, or block size, is usually constant throughout a RAID array and is usually defined when the RAID array is created. Thus, a stripe has a total storage space of the block size times the difference between the number of disks in the RAID array and the number of parity blocks per stripe. One or more blocks of each stripe are reserved for storing parity information. Parity information is mathematically derived from the data in other blocks of the stripe, conventionally by performing a logical "exclusive or" (XOR) operation on the data within the stripe. In the event of a disk failure, the data from any particular block on the disk that failed can be recreated by performing the XOR operation on the data and parity information in the remaining blocks of the stripe to recreate the lost data, and the recreated data is then typically written to a spare disk associated with the RAID array. In this manner the data from the failed disk is recreated on the spare disk to maintain the fully functional RAID array.

One way of distributing parity blocks throughout a RAID array is to keep all of the parity blocks on a single dedicated parity disk, as is the case in RAID levels 3 and 4. Since parity information is usually calculated and written to disk every time data is written to an array, a dedicated parity disk usually incurs a write operation whenever data is written to another disk of the array. Although the use of RAID levels 3 or 4 may be desirable in certain situations, continual write operations to the dedicated parity disk can result in the parity disk becoming a performance bottleneck. Another way of distributing parity blocks throughout a RAID array is to distribute the parity blocks evenly across all of the disks in the array, as is the case in RAID level 5. Arrays with striped parity generally have better read and write performance than arrays with dedicated parity disks, since no particular disk is written to every time data is written to the array, which can result in a higher data throughput compared to RAID levels 3 and 4.

A RAID array is usually controlled by a RAID controller, which may be implemented in hardware, such as a RAID controller card, or in software, such as a RAID aware operating system. The RAID controller presents the data blocks on the RAID array to the operating system of the computer to which the array is attached as a logical address space. A logical address space is typically a sequential series of numbers, or addresses, starting from 1 and continuing to the maximum number of data blocks in the array. The RAID controller performs any necessary conversion to determine which physical data block on a particular disk corresponds to which address within the logical address space of the array, and vice versa.

Creating a distributed parity disk array having distributed parity, such as a RAID level 5 array, on a particular number of disks involves designating certain blocks of the disks for use as parity blocks and certain other blocks of the disks for use as data blocks. A simple way of designating data and parity blocks in an array of N disks is to assign the parity block of the first stripe to the first disk, assign the parity block of the second stripe to the second disk, and so on until the parity block of the Nth stripe is assigned to the Nth disk. The data and parity blocks for the remaining stripes are then assigned to blocks of the disks according to the pattern defined by the first N stripes. Similarly, a dual parity array on N disks can be created by assigning the parity blocks for the first stripe to the first and second disks, then assigning the parity blocks for the second stripe on the second and third disks, and so on until the parity blocks for the Nth stripe are assigned to the first and last disks. The pattern defined by the allocation of parity and data blocks for the first N stripes is then repeated for the remaining stripes.

Partially as a result of continued business operations and increased governmental regulation, most businesses have data storage requirements which are continually increasing. A system administrator who manages a data storage server typically adds another RAID array to the data storage server when the existing RAID array(s) are running out of available data storage space. Allocating a new RAID array to accommodate increasing data storage requirements is typically less than ideal because the new RAID array may have much more data storage space than will be needed or used in the immediate future. A more ideal solution is to add disks to an existing RAID array as needed to meet increasing data storage requirements.

Most RAID controllers can create or delete a striped distributed parity RAID array, but are not typically functional to expand the array by adding a new disk once the array has been created. One of the challenges involved in adding a new disk to an existing array is determining how to redistribute the parity blocks across the disks of the array evenly (i.e., each disk has substantially the same number of parity blocks). It is desirable to minimize assigning parity blocks to locations which were previously data blocks while redistributing the parity blocks in order to minimize the amount of data blocks that must be copied before new parity information is calculated. Redistributing parity blocks is especially challenging in distributed parity RAID arrays having dual or higher order parity, since care must be taken to avoid attempting to assign two parity blocks from the same stripe to the new disk.

These and other considerations have led to the evolution of the present invention.

SUMMARY OF THE INVENTION

The present invention is applied to redistribute parity blocks within a distributed parity disk array ("DPDA") connected to a data storage server computer after the addition of a new disk to the DPDA. Typically, a processor of the data storage server computer executes software, such as a storage operating system, to implement the functionality of the present invention. The distribution of parity and data blocks within the DPDA is defined by a parity pattern which repeats every K stripes within the DPDA. The parity pattern contains information regarding which blocks within a grid of K stripes by N disks are designated as parity blocks and which blocks are designated as data blocks. The number of K stripes within the parity pattern is referred to as a repeat interval of the parity pattern.

A single parity DPDA having N disks, an original repeat interval and an original parity pattern is expanded to cover N+1 disks by calculating a new repeat interval, creating a new parity pattern and redistributing the parity blocks within the DPDA to conform to the new parity pattern. The new parity pattern is created by defining an intermediate parity pattern having a length equal to the new repeat interval, populating the intermediate parity pattern with the original parity pattern, and selecting 1/(N+1) parity blocks from each original disk within the intermediate parity pattern for transfer to the new disk. The new parity pattern is then defined by the intermediate parity pattern.

A dual or higher order parity DPDA having multiple parity blocks per stripe (a "DPDA-MP"), N disks, an original repeat interval and an original parity pattern is expanded to cover N+1 disks by calculating a new repeat interval, creating a new parity pattern and redistributing the parity blocks within the DPDA-MP to conform to the new parity pattern. The new parity pattern is created by defining an intermediate parity pattern having a length equal to the new repeat interval, populating the intermediate parity pattern with multiples of the original parity pattern, assigning different symbolic identifiers to the parity blocks within the intermediate parity pattern which uniquely identify the parity blocks within a stripe, calculating a transfer number equal to 1/(N+1), selecting one of the symbolic identifier types for transfer and then transferring a number of parity blocks from each original disk which were assigned the selected identifier to the new disk equal to the transfer number within the intermediate parity pattern to create the new parity pattern.

Redistributing parity blocks within an DPDA upon the addition of a new disk to the DPDA in accordance with the present invention results in parity blocks being evenly distributed across the disks of the DPDA. The disruption of parity block assignments existing before the addition of the new disk is minimized during the redistribution of parity blocks within the DPDA. Parity blocks are also redistributed in DPDA-MPs without the possibility of selecting two or more parity blocks within the same stripe of a parity pattern for transfer to the new disk.

One aspect of the present invention involves a method of redistributing parity blocks within a DPDA upon the addition of a new disk to the DPDA. The method involves determining an original parity pattern of the DPDA, determining an original repeat interval of the original parity pattern, creating an intermediate parity pattern based on the original parity pattern, determining the number of parity blocks assigned to each original disk within the intermediate parity pattern, calculating a transfer number based on the number of parity blocks determined, creating a new parity pattern by transferring to the new disk in the intermediate parity pattern a number of parity blocks from each original disk equal to the transfer number, and redistributing the parity blocks within the DPDA to conform to the new parity pattern.

Another aspect of the present invention involves a method of redistributing parity blocks within a dual or higher order DPDA, or DPDA-MP. The method involves determining an original parity pattern, creating an intermediate parity pattern based on the original parity pattern, determining the number of parity blocks assigned to each disk within the intermediate parity pattern, calculating a transfer number, establishing a number of different symbolic identifiers equal to the order of parity of the DPDA-MP, assigning the symbolic identifiers to the parity blocks within the intermediate parity pattern, one disk at a time, so that each disk within the intermediate parity pattern has substantially the same number of each symbolic identifier and each stripe has only one of each of the types of symbolic identifiers, selecting one of the types of the symbolic identifiers and transferring from the original disks to the new disk within the intermediate parity pattern a number of parity blocks assigned the selected symbolic identifier type equal to the transfer number to create a new parity pattern, then redistributing the parity throughout the DPDA-MP to conform to the new parity pattern. The parity blocks in the DPDA-MP are then redistributed to conform to the new parity pattern.

Another aspect of the present invention involves a computer system having a host computer and a plurality of data storage devices. Coupled with the host computer is a DPDA controller. The plurality of data storage devices are organized into an DPDA. A DPDA metadata area is located within at least one of the data storage devices. A parity pattern defining a repeated distribution of parity blocks within the DPDA is stored in the DPDA metadata area and is used by the DPDA controller to determine the location of parity blocks within the DPDA.

A more complete appreciation of the present invention and its scope may be obtained from the accompanying drawings, which are briefly summarized below, from the following detailed description of presently preferred embodiments of the invention, and from the appended claims.

BRIEF DESCRIPTION OF THE DRAWINGS

FIG. 5 is diagrammatic illustration of an original and a new partial parity pattern which shows a potential problem involved with adding a new disk to a dual or higher order parity DPDA which the present invention solves.

FIG. 7 is a diagrammatic and graphical illustration of a sequence of various parity patterns which are used in accordance with the present invention when adding a fourth disk to a three disk dual parity DPDA.

DETAILED DESCRIPTION

The present invention involves the use of a parity pattern which defines a repeated distribution of parity blocks within a distributed parity disk array ("DPDA"). The parity pattern is a logical construct that may be stored within a memory or other data storage medium as a data structure, such as an array, containing information that identifies or facilitates identification of the blocks within a stripe of the DPDA which are designated as parity blocks. The parity pattern is modified when a new disk is added to the DPDA, resulting in a new parity pattern for use with the DPDA. The parity blocks within the DPDA are redistributed by transferring a minimal number of parity blocks within the DPDA to the new disk in accordance with the new parity pattern resulting in an even distribution of parity blocks throughout the DPDA. The parity blocks in DPDA's having dual or higher order parity are redistributed without the possibility of inadvertently selecting two parity blocks within the same stripe for transfer to the new disk.

Figure 1:
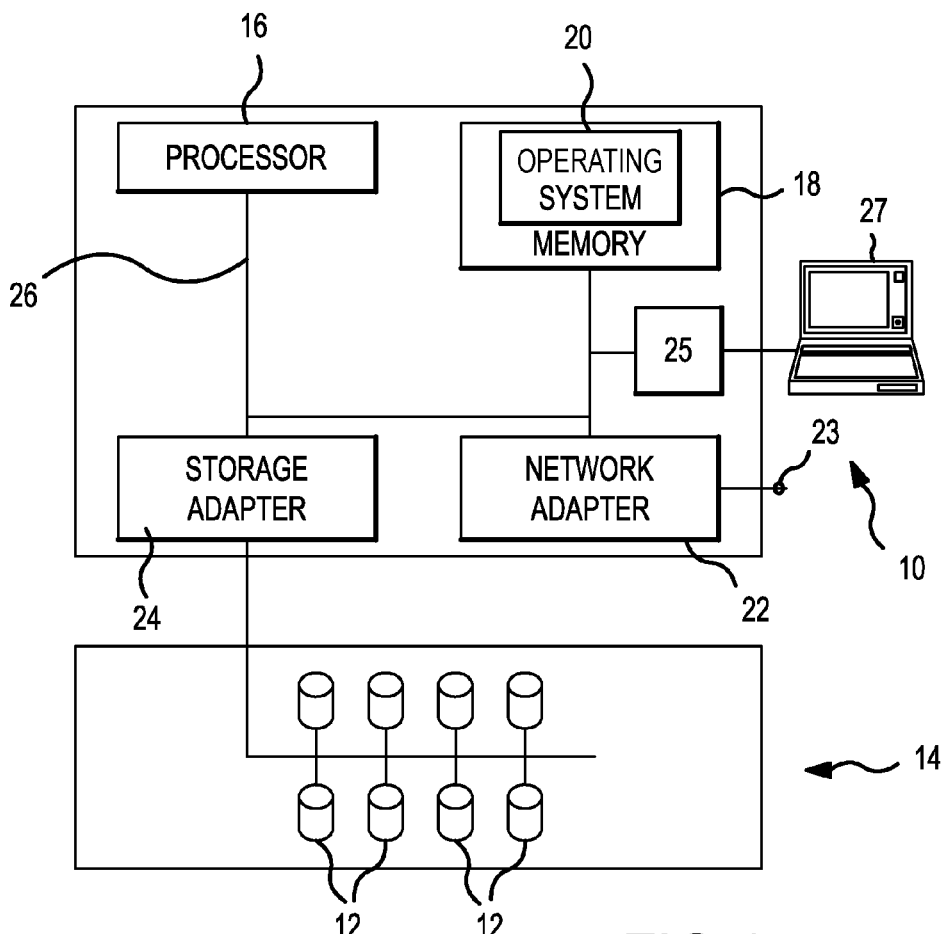
FIG. 1 is a diagrammatic illustration of a computer and a disk subsystem composed of disks which incorporates the present invention.

As shown in FIG. 1, a computer 10 stores data in disks 12 which are part of an attached data storage subsystem 14. The computer 10 has a processor 16 for executing programs, a memory 18 which contains a mass data storage operating system 20, a network adapter 22 for communicating with other computers (not shown) over a communications path 23, and a storage adapter 24 for communicating with the disks 12 within the data storage subsystem 14. The operating system 20 is executed by the processor 16 and generally controls the operation of the computer 10. The operating system 20 uses free space areas within the memory 18 known as buffers to temporarily store data used by the operating system 20 as part of the routine operation of the operating system 20. A system bus 26 connects the processor 16, the memory 18, the network adapter 22 and the storage adapter 24 to allow communications between them. A serial port interface 25 connects an administrative console 27 to the computer 10. The administrative console 27 is adapted to communicate with the operating system 20 of the computer 10. A system administrator typically uses the administrative console 27 to interact with the operating system 20 and to generally manage the computer 10 and the data storage subsystem 14.

Figure 2:
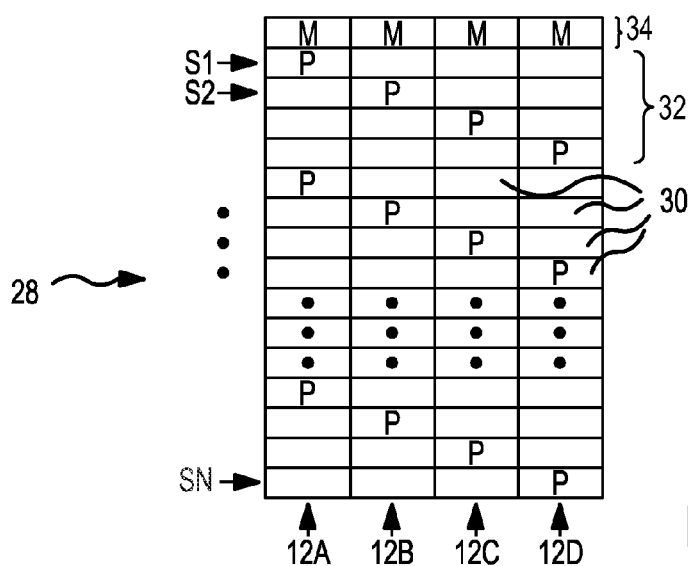
FIG. 2 is a diagrammatic illustration of a distributed parity disk array ("DPDA") composed of four of the disks of the disk subsystem shown in FIG. 1.

A distributed parity disk array ("DPDA") 28 having single parity and composed of four disks 12A-12D from the disks 12 (FIG. 1) of the data storage subsystem 14 (FIG. 1) is shown in FIG. 2. The disks 12A-12D are of the traditional magnetic platter variety but could also include solid state, optical, or other devices which store data for later retrieval. The term "disks" as used herein includes such other types of data storage devices such as solid state drives and other field replaceable data storage devices. The operation of the DPDA 28 is controlled by the operating system 20 (FIG. 1) which performs the function of a DPDA or RAID controller. Other embodiments of the present invention may involve a RAID controller that is implemented in hardware or in software other than the operating system 20. Each column of the DPDA 28 represents one of the disks 12A-12D and each row of the DPDA 28 represents one of stripes S1-Sn of the DPDA 28. Each of the disks 12A-12D is composed of multiple blocks 30 and each of the stripes S1-Sn is composed of one of the blocks 30 from each of the disks 12A-12D. Those blocks 30 which are shown containing the letter "P" are designated as parity blocks. Those blocks 30 shown without a letter are designated as data blocks. Since the DPDA 28 is single parity, each of the stripes S1-Sn includes a single parity block. Each of the stripes S1-Sn contains three data blocks and one parity block. A particular data block may or may not be populated with actual data. When data is written to a particular data block by the computer 10, parity information for the stripe S1-Sn containing that particular data block is calculated by the operating system 20 (FIG. 1) from all of the data blocks within that stripe S1-Sn and is written to the parity block within that stripe S1-Sn. The distribution of parity blocks within the DPDA 28 is defined by a parity pattern 32. The parity pattern 32 repeats every K stripes S1-Sn throughout the DPDA 28, with K being referred to herein as a repeat interval.

The parity pattern 32 is shown as a grid of stripes by disks for purposes of explanation. In practice, the parity pattern 32 may take any form that conveys the information of which blocks within K repeated stripes are designated as parity blocks. For example, a particular ordered sequence of K numbers may define a parity pattern for a single parity DPDA with the position of each number within the ordered sequence identifying the position of the stripe within the parity pattern and the magnitude of each number defining the disk within that identified stripe whose block for that stripe is designated as the parity block.

The repeat interval K for the DPDA 28 shown in FIG. 2 is the number four, since the parity pattern 32 is four stripes in length. Information related to the structure of the DPDA 28 and used by the operating system 20 (FIG. 1) to control and operate the DPDA 28 is stored in a DPDA metadata area 34. The DPDA metadata area 34 is composed of at least one block 30 from each disk 12A-12D. Blocks 30 which comprise the DPDA metadata area 34 of the DPDA 28 are shown with the letter "M." The blocks 30 which make up the DPDA metadata area 34 are data blocks from the perspective of the disks 12A-12D but are metadata blocks "M" for the DPDA 28 from the perspective of the operating system 20. Each of the disks 12A-12D also has its own metadata storage areas (not otherwise shown) separate from the blocks 30 which make up the DPDA metadata area 34 and which are used to store metadata information which is specific to the particular disk. Information stored in the DPDA metadata area 34 typically includes the number of disks within the DPDA 28, identification information or serial numbers of the disks within the DPDA 28 and the parity pattern 32, among other types of information specific to the DPDA 28.

Storing the parity pattern 32 within the metadata area 34, or in some other location accessible by the operating system 20, allows the operating system 20 to read the parity pattern 32 from the metadata area 34, or from the other location. As an alternative to storing the parity pattern 32 in the metadata area 34, the operating system 20 could also determine the parity pattern 32 by inspection of the disks 12A-12D of the DPDA 28, provided that blocks designated as parity blocks are discernable from blocks designated as a data blocks. Storing the parity pattern 32 within the metadata area 34 is preferred to determining the parity pattern 32 by inspection since the operating system 20 can typically load the parity pattern 32 into memory by reading the parity pattern 32 from the metadata area 34 quicker than it can determine the parity pattern 32 by inspection of the disks 12 of the DPDA 28.

The parity pattern 32 and the repeat interval K are used by the operating system 20 to quickly determine the location of a parity block for a particular stripe S1-Sn. For example, to determine on which disk the parity block for the tenth stripe of the DPDA 28 resides, the operating system 20 divides the stripe number (ten) by the repeat interval K (four) of the parity pattern 32 in order to determine the remainder. The remainder of this division is two. The location of the parity block for the tenth stripe is then determined by identifying which of the disks 12A-12D is assigned the parity block of the second stripe within the parity pattern 32. As can be seen by examining the parity pattern 32 in FIG. 2, the parity block for the second stripe within the parity pattern 32 is assigned to disk 12B within the parity pattern 32. Therefore the location of the parity block for the tenth stripe of the DPDA 28 is disk 12B.

The use of a parity pattern 32 by the operating system 20 facilitates the efficient determination of which disk the parity block or blocks is assigned to for a particular stripe S1-Sn.

As the available data storage capacity of the DPDA 28 diminishes, the system administrator of the computer 10 typically uses the administrative console 27 to instruct the operating system 20 to add another disk, such as one of disks 12, to the DPDA 28 in order to expand the available data storage capacity of the DPDA 28. One of the tasks that the storage operating system 20 performs when adding a disk to the DPDA 28 is redistributing the parity throughout the DPDA 28 so that each of the disks of the DPDA 28 has the same, or near the same number of parity blocks. In other embodiments of the present invention the redistributing of parity blocks throughout the DPDA 28 may be accomplished by other components of the computer 10, such as other software or hardware components of the computer 10. During the process of distributing parity among the disks of the DPDA 28 as described below, the operating system 20 is presumed to use the buffers of the memory 18 to temporarily store values and other data structures as needed.

Figure 3:
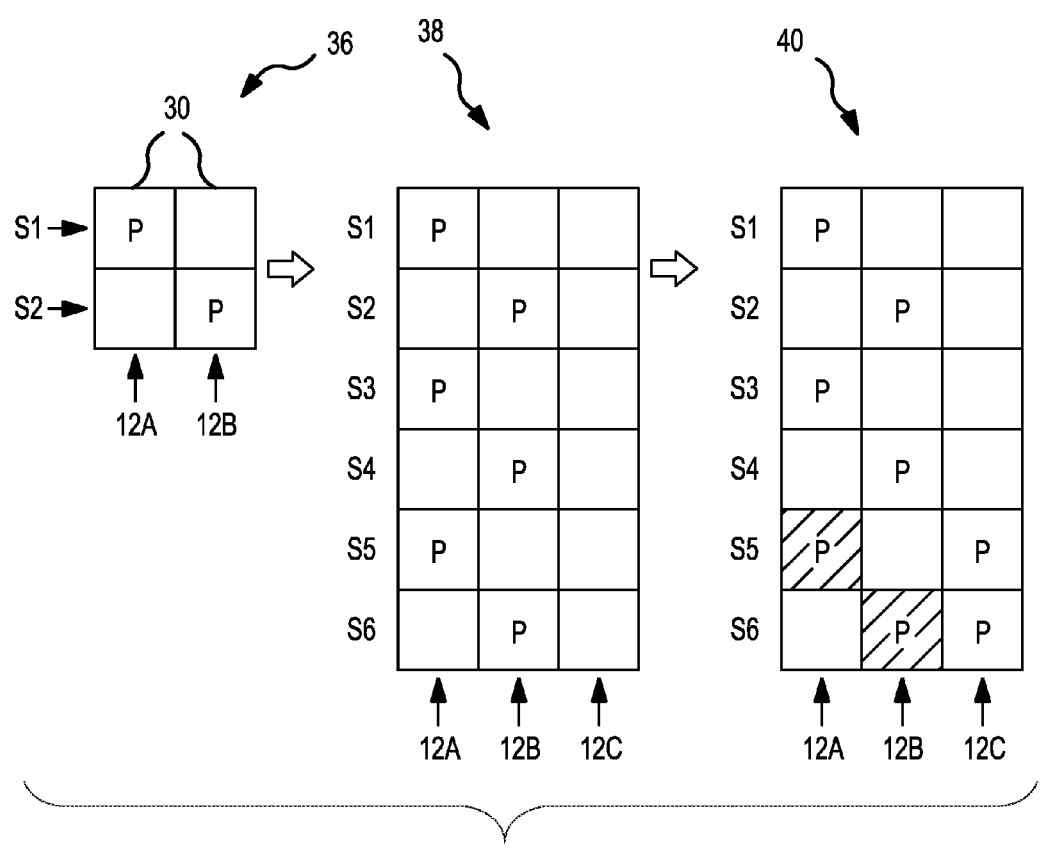
FIG. 3 is a diagrammatic and graphical illustration of a sequence of various parity patterns which are used in accordance with the present invention when adding a third disk to a two disk DPDA composed of disks of the disk subsystem shown in FIG. 1.

The process of creating a new parity pattern for a single parity DPDA to which a new disk has been added and in accordance with the present invention is described below with reference to FIG. 3. An original parity pattern 36 for the minimal configuration of a single parity DPDA has two rows representing stripes S1 and S2 and two columns representing the portions of disks 12A and 12B within the original parity pattern 36. The original parity pattern 36 has an original repeat interval of two, since the pattern 36 is two stripes in length. The original parity pattern 36 is composed of four blocks 30, two of which are parity blocks designated by the letter "P" with data blocks constituting the remaining two blocks 30. The original parity pattern 36 represents the repeated distribution of parity within a two disk DPDA (not shown). Adding a new disk to the DPDA having a parity distribution represented by the original parity pattern 36 results in a total disk count of 3. A new repeat interval for the now expanded DPDA is calculated by determining the least common multiple (LCM) between the original repeat interval (two) and the total disk count (three). The new repeat interval is therefore six, which is the LCM of two and three. An intermediate parity pattern 38 is then created with as many columns as the total disk count (three), including the original disks and the new disk, and as many rows as the new repeat interval (six). The first two columns of the intermediate parity pattern 38 represent a portion of the two original disks 12A and 12B and the third column represents a portion of the new disk 12C of the now expanded DPDA. The intermediate parity pattern 38 is populated from the first stripe S1 to the last stripe S6 with left-justified multiples of the original repeat pattern 36. In effect, the intermediate parity pattern 38 at this point represents the distribution of parity across the first six stripes of the DPDA. A transfer number is then determined by dividing the number of parity blocks assigned to each of the original disks in the intermediate parity pattern 38 by the total disk count, which includes the number of original disks and the new disk. The transfer number in this case is three divided by three which equals one. A number of parity blocks equal to the transfer number (one) is then selected for transfer and transferred from each of the original disks 12A and 12B to the new disk 12C within the intermediate parity pattern 38 to create a new parity pattern 40. In the case of a single parity DPDA, such as this, which one of the three parity blocks that is selected for transfer from each of the original disks 12A and 12B to the new disk 12C within the intermediate parity pattern 38 to create the new parity pattern 40 is arbitrary. The blocks 30 within the new parity pattern 40 containing shading represent the previous location of the parity blocks in the intermediate parity pattern 38 for stripes S5 and S6.

Figure 4:
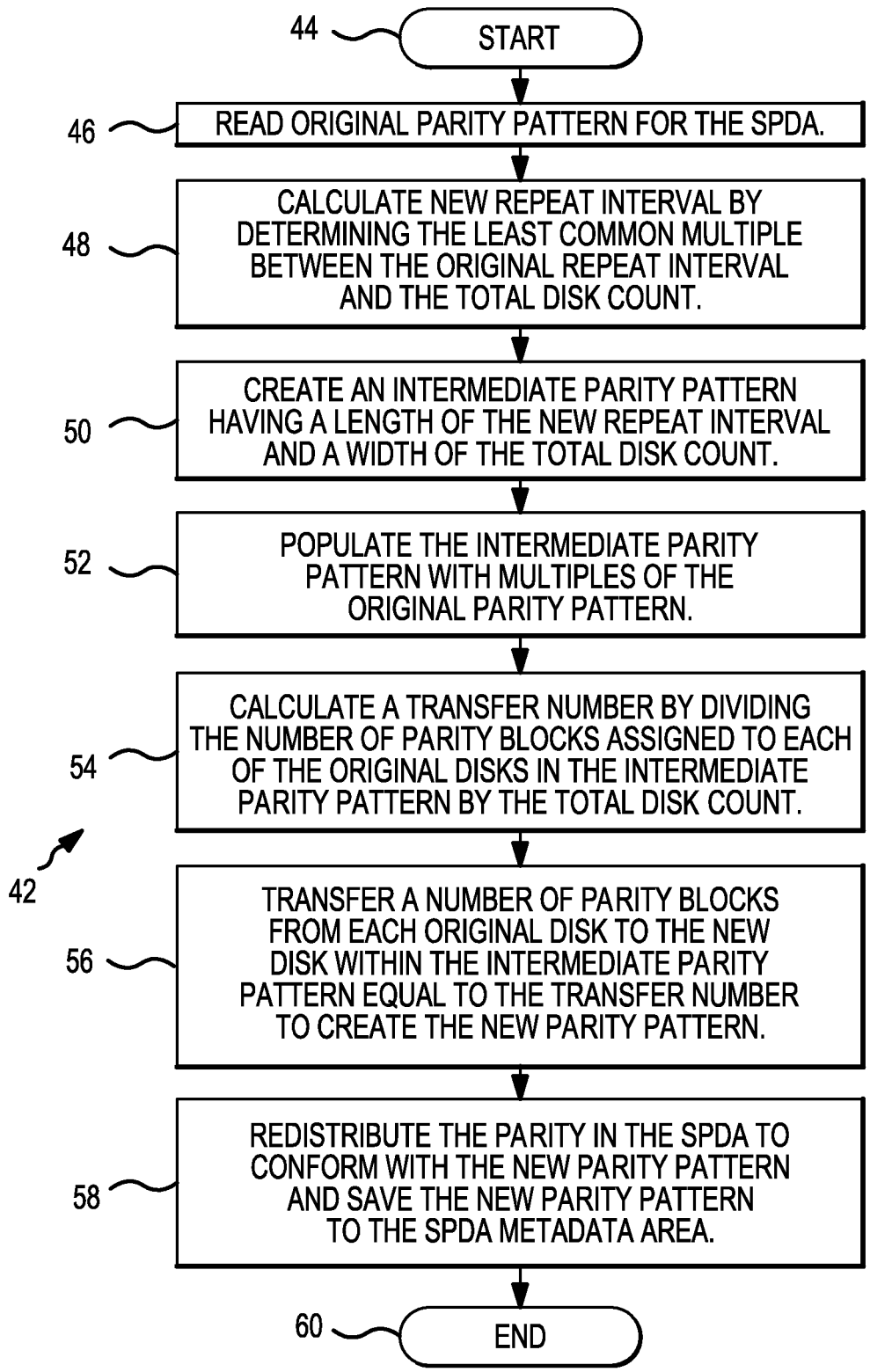
FIG. 4 is a flow chart showing a process flow performed by the computer shown in FIG. 1 upon the addition of a new disk to a single parity DPDA.

An exemplary process flow 42 for determining a new parity pattern for a single parity DPDA when a new disk is added to the DPDA is shown in FIG. 4. The process flow 42 is applicable to single parity DPDAs such as the DPDA represented by original parity pattern 36 (FIG. 3). The process flow 42 is executed by the operating system 20 (FIG. 1) when a new disk is added to the DPDA. The process flow 42 starts at 44. At 46, the original parity pattern for the DPDA is read from the DPDA metadata area 34 (FIG. 2). The original parity pattern is preferably stored as an array within the DPDA metadata area 34 (FIG. 2). Such an array preferably contains K numbers which indicate on which disk the parity block for a stripe is assigned. The first number of the array indicates to which disk the parity block for the first stripe is assigned, the second number indicates to which disk the parity block for the second stripe is assigned, and so on. The original repeat interval is K which is the length of the original parity pattern.

A new repeat interval is then calculated at 48 by determining the least common multiple between the original repeat interval and the total disk count of the DPDA, which includes the original disks and the new disk. An intermediate parity pattern is created having a length of the new repeat interval and a width of the total disk count, at 50. At 52, the intermediate parity pattern is populated with multiples of the original parity pattern. A transfer number is then calculated, at 54, by dividing the number of parity blocks assigned to each original disk within the intermediate parity pattern by the total disk count. A number of parity blocks from each original disk in the intermediate parity pattern equal to the transfer count is then selected and transferred to the new disk to create the new parity pattern, at 56. At 58, the parity blocks in the DPDA are redistributed to conform with the new parity pattern and the new parity pattern is stored in the DPDA metadata area 34 (FIG. 2). The process flow 42 ends at 60.

Redistributing the parity blocks of a DPDA having multiple parity ("DPDA-MP") upon the addition of a new disk requires a different process than the process flow 42 (FIG. 4) previously described for use with single parity DPDAs. The problem with using the process flow 42 on a DPDA-MP is that two parity blocks from the same stripe may be inadvertently selected for transfer to the new disk. Only one block per disk is assigned to each stripe. Of course, one block cannot store the data of two other blocks. This situation is illustrated in FIG. 5. A parity pattern 62 of a three disk 12A-12C DPDA-MP having dual parity is superimposed on a partial parity pattern 64 of a four disk 12A-12D DPDA-MP. The partial parity pattern 64 resulted from attempting to apply the process flow 42 to the DPDA-MP having the parity pattern 62. The shaded parity blocks 66 represent the parity blocks of each of the original disks 12A-12C within the repeated parity pattern 32E that were selected for transfer to the new disk 12D. As can be seen in the partial parity pattern 64, following the process flow 42 resulted in an attempt to move the two parity blocks from the stripe S6 to the block for S6 on the new disk 12D. A different process than the process flow 42 is therefore required when adding a new disk to a DPDA-MP to avoid inadvertently selecting more than one parity block from any particular stripe to be moved to the new disk.

Figure 6:
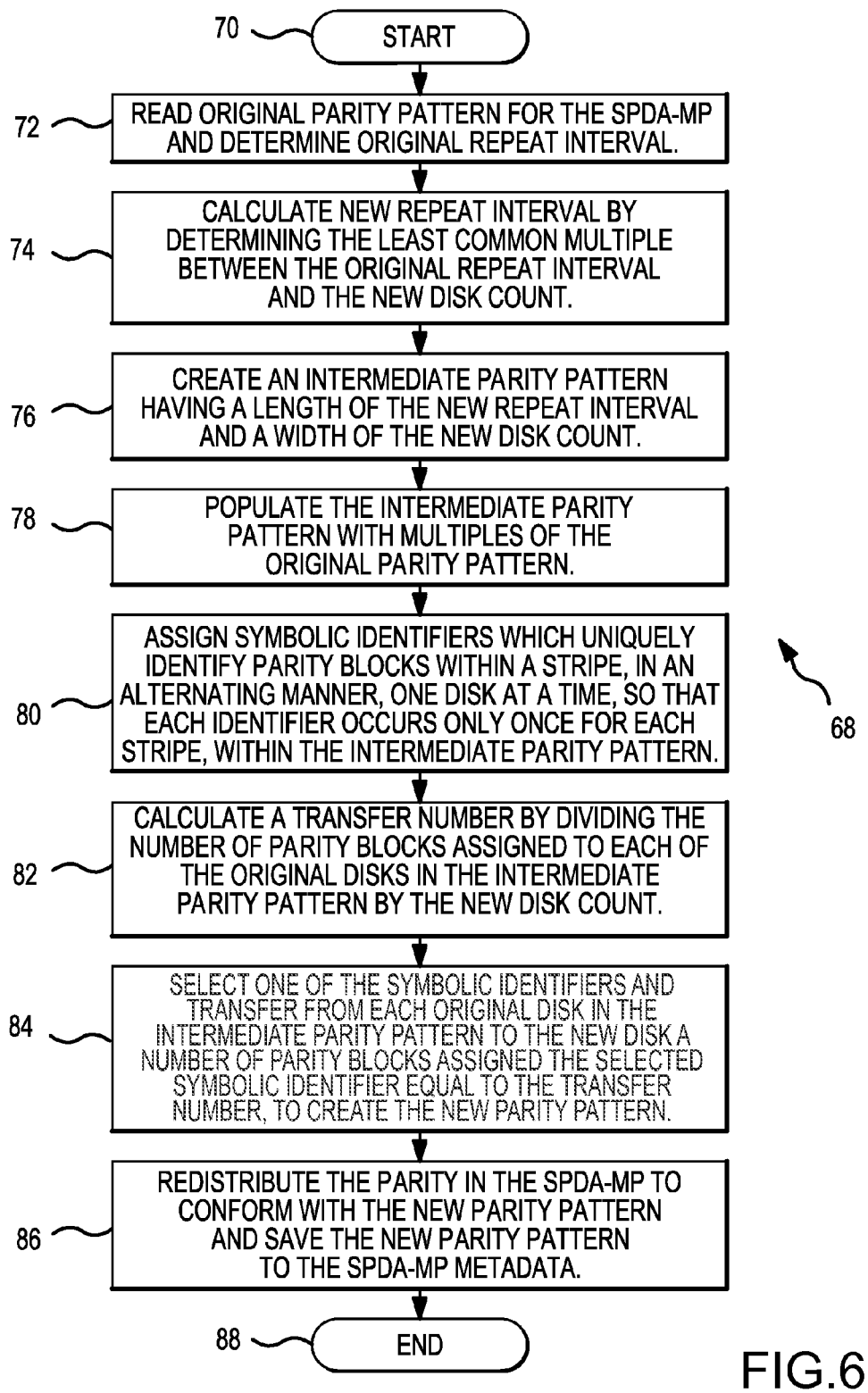
FIG. 6 is a flow chart showing a process flow performed by the computer shown in FIG. 1 upon the addition of a new disk to an DPDA of dual or higher order parity.

A process flow 68 for redistributing the parity among the disks in a DPDA-MP upon the addition of a new disk is shown in FIG. 6. The process flow 68 is executed by the operating system 20 (FIG. 1) when a new disk is added to the DPDA-MP. The process flow 68 starts at 70. At 72, the original parity pattern of the DPDA-MP is read from the DPDA metadata area 34 (FIG. 2). The original repeat interval is the length, in stripes, of the original parity pattern. A new repeat interval is then computed, at 74, by determining the least common multiple between the original repeat interval and the total disk count. An intermediate parity pattern is then created having a length of the new repeat interval and a width of the total disk count, at 76. At 78, the intermediate parity pattern is populated with multiples of the original parity pattern. At 80, symbolic identifiers which uniquely identify parity blocks within a stripe are assigned to the parity blocks within the parity pattern. As many different symbolic identifiers as the order of parity of the DPDA-MP are used to differentiate parity blocks within a stripe. A DPDA-MP having an order of parity of two would therefore have two different symbolic identifiers, "P1" and "P2," for example, one of which is assigned to each parity block within each stripe of the DPDA-MP. The symbolic identifiers are assigned to the parity blocks within the parity pattern, one disk at a time, so that each stripe contains only one of each symbolic identifier and each original disk contains substantially the same number of each of the different symbolic identifiers.

In one embodiment the assignment of symbolic identifiers is started with the first disk for which the identifiers are assigned to end up with the same number of each type. For each of the other disks, stripes where one (or more) parity blocks have already been assigned symbolic identifiers on the previous disks, the identifier is assigned in a manner such that it doesn't violate the condition that each stripe contains only one of each identifier type. For the other stripes symbolic identifiers are assigned in a manner which helps equalize the number of each identifier type within that disk.

A transfer number is then calculated, at 82, by dividing the number of parity blocks assigned to each of the original disks in the intermediate parity pattern by the total disk count. One of the different symbolic identifiers is then selected for transfer, and a number of parity blocks assigned the selected symbolic identifiers equal to the transfer number is transferred from each original disk to the new disk within the intermediate parity pattern to create the new parity pattern, at 84. At 86, the parity blocks within the DPDA-MP are redistributed to conform to the new parity pattern and the new parity pattern is saved with the DPDA-MP metadata. The process flow 68 ends at 88.

An application of the process flow 68 to a DPDA-MP is described below with reference to FIG. 7. An original parity pattern 90 representing the parity distribution throughout the DPDA-MP is read from the metadata area of the DPDA-MP in accordance with 72 of the process flow 68. The original parity pattern 90 has an original repeat interval of three, covers three disks and has an order of parity of two since each stripe S1-S3 contains two parity blocks. A total disk count is calculated by adding the number one, which represents a new disk to be added to the DPDA-MP, to the number of disks in the original parity pattern 90, i.e. three, which equals a total of four.

A new repeat interval is calculated by determining the LCM between the original repeat interval of three and the total disk count of four, which is twelve, in accordance with 74 of the process flow 68. An intermediate parity pattern 92A is then created in accordance with 76 of the process flow 68 having a length of twelve, which is the new repeat interval, and a width of four, which is the total disk count. The intermediate parity pattern 92A is populated with left-justified multiples of the original parity pattern 90 in accordance with 78 of the process flow 68. Symbolic identifiers P1 and P2 are then assigned to all of the parity blocks within the intermediate parity pattern in accordance with 80 of the process flow 68. Two different symbolic identifiers are chosen because the DPDA-MP to which intermediate parity pattern 92A relates is dual parity. If the DPDA-MP were a triple parity DPDA-MP, then three unique identifiers would be chosen.

The two symbolic identifiers P1 and P2 are assigned to each of the original disks 12A-12C, one disk at a time. The symbolic identifiers P1 and P2 are assigned to the parity blocks on the first disk, disk 12A, so that a substantially equal number of each identifier has been assigned to the parity blocks on the first disk. The symbolic identifiers are then assigned to the parity blocks on the remaining original disks 12B and 12C, one disk at a time, by first assigning an identifier to the parity blocks which are part of a stripe that already has a parity block which has been assigned a symbolic identifier P1 or P2. The symbolic identifier that is assigned to a parity block in this circumstance is an identifier different from the identifier already assigned to a parity block within that stripe. For example, the parity block corresponding to the first stripe S1 and the second disk 12B within the intermediate parity pattern 92A is assigned the symbolic identifier P2, since a parity block within stripe S1 has already been assigned the identifier P1. After the parity blocks within the disk 12B which are part of a stripe which already had a parity block assigned a symbolic identifier are assigned a symbolic identifier, the remaining parity blocks within the disk 12B are assigned symbolic identifiers so that the number of assigned symbolic identifiers P1 equals the number of assigned symbolic identifiers P2. After the symbolic identifiers have been assigned to all of the parity blocks within disk 12b of the intermediate parity pattern 92A, the parity blocks of disk 12C are assigned symbolic identifiers in a manner similar to how the symbolic identifiers were assigned to the parity blocks of disk 12B. Intermediate parity pattern 92B represents the state of the intermediate parity pattern 92A after all of the parity blocks have been assigned one of the symbolic identifiers P1 or P2. Each of the stripes within the intermediate parity pattern 92B contains only one of each of the different symbolic identifiers, P1 and P2, and each disk 12A-12C contains a substantially equal number of each of the different symbolic identifiers, or four each of P1 and P2.

After all of the parity blocks on all of the original disks 12A-12C within the intermediate parity pattern 92B have been assigned one of the symbolic identifiers P1 or P2, a transfer number is calculated in accordance with 82 of the process flow 68. The transfer number is calculated by dividing the number of parity blocks assigned to each of the original disks in the intermediate parity pattern 92B by the total disk count. The transfer number in this scenario is eight divided by four, or two. Next, one of the symbolic identifiers is selected and a number of the parity blocks assigned the selected identifier equal to the transfer number (two) is transferred from each original disk 12A-12C to the new disk 12D, within the intermediate parity pattern 92B and in accordance with 84 of the process flow 68, resulting in the new parity pattern 94A. The blocks shown with shading in new parity pattern 94A represent blocks which were previously parity blocks, but which are now data blocks. New parity pattern 94B shows the parity blocks of new parity pattern 94A, without the symbolic identifiers. The new parity pattern 94B is then stored in the DPDA-MP metadata area and the parity blocks within the DPDA-MP are redistributed to be in conformance with the new parity pattern 94B, in accordance with 86 of the process flow 68. The end result of using the process flow 42 (FIG. 4) or the process flow 68 (FIG. 6) is to redistribute parity within a DPDA or DPDA-MP upon the addition of a new disk to the DPDA or DPDA-MP in an even distribution of parity blocks within the DPDA or DPDA-MP. The number of parity blocks which must be moved to the new disk from the original disks is kept to a minimum. The inadvertent assignment of two or more parity blocks within a single stripe of an DPDA-MP to the new disk is avoided. The use of a parity pattern in accordance with the present invention facilitates the efficient determination of the disk or on which disks a parity block or multiple parity blocks for a particular stripe resides. The use of the parity pattern in accordance with the present invention allows for a faster determination of parity block location information than can be achieved with the use of a complete DPDA or DPDA-MP mapping and requires much less data storage space within the DPDA metadata area to perform that determination. These and other improvements and advantages will be more apparent after comprehending the full ramifications of the present invention.

The techniques described for expanding a RAID array by adding a new disk to the RAID array could also be followed in reverse to remove a disk from a RAID array, after moving the data within used data blocks of the disk to be removed to other disks within the RAID array.

Presently preferred embodiments of the present invention and many of its improvements have been described with a degree of particularity. This description is a preferred example of implementing the invention, and is not necessarily intended to limit the scope of the invention. The scope of the invention is defined by the following claims.

What is claimed is:

1. A method of redistributing parity blocks within a distributed parity disk array ("DPDA") composed of original data storage devices ("disks") upon the addition of a new disk, comprising:
    determining an original parity pattern of the DPDA which indicates parity block assignments among the original disks;
    determining an original repeat interval of the original parity pattern;
    creating an intermediate parity pattern based on the original parity pattern, the intermediate parity pattern indicating parity block assignments among the original disks and the new disk;
    determining a number of parity blocks assigned to each original disk within the intermediate parity pattern;
    determining a total number of disks in the DPDA including the original disks and the new disk;
    calculating a transfer number equal to the number of parity blocks assigned to each original disk within the intermediate parity pattern divided by the total number of disks within the DPDA;
    creating a new parity pattern by transferring to the new disk within the intermediate parity pattern a number of parity blocks from each original disk equal to the transfer number; and
    redistributing the parity blocks within the DPDA to conform the new parity pattern.

2. A method as defined in claim 1, wherein metadata related to the DPDA is stored in a DPDA metadata area, the method additionally comprising:
    determining an original parity pattern of the DPDA by reading the original parity pattern from the DPDA metadata area; and
    writing the new parity pattern to the DPDA metadata area.

3. A method as defined in claim 1, additionally comprising:
    creating the intermediate parity pattern based on the original parity pattern by calculating a new repeat interval based on the original repeat interval and the number of disks within the DPDA, including the original disks and the new disk, creating the intermediate parity pattern large enough to contain information concerning parity block location for a number of stripes equal to the new repeat interval, and populating the intermediate parity pattern with multiples of the original parity pattern.

4. A method as defined in claim 3, additionally comprising:
    calculating a new repeat interval by determining the least common multiple between the original repeat interval and the total number of disks within the DPDA, including the original disks and the new disk.

5. A method as defined in claim 4, wherein the DPDA has dual or higher order parity, the method additionally comprising:
    establishing different symbolic identifiers;
    assigning the symbolic identifiers to the parity blocks within the intermediate parity pattern so that no stripe within the intermediate parity pattern contains more than one of the same type of symbolic identifier and each original disk contains a substantially equal number of each of the different symbolic identifiers;
    selecting one type of symbolic identifier from the different types of symbolic identifiers; and
    creating a new parity pattern by transferring to the new disk form each original disk within the intermediate parity pattern a number of parity blocks which have been assigned the selected symbolic identifier equal to the transfer number.

6. A method as defined in claim 5, additionally comprising:
    establishing different symbolic identifiers by establishing as many different symbolic identifiers as the order of parity of the DPDA.

7. A computer system comprising:
    a host computer;
    a DPDA controller in communication with the host computer, the DPDA controller comprising a processor in communication with a memory, the memory storing computer executable code;
    a plurality of original data storage devices ("disks") coupled to at least one of the host computer or the DPDA controller;
    a DPDA comprising at least two of the original disks, the DPDA comprising a plurality of stripes;
    a DPDA metadata storage area within at least one of the original disks; and
    a data structure comprising an original parity pattern within the metadata storage area that defines an original repeat interval of parity blocks distributed within the DPDA,
    wherein, when a new disk is added to the DPDA, the processor executes the computer executable code to perform DPDA controller functions comprising:
        reading the original parity pattern from the data structure and storing the original parity pattern in the memory;
        determining the original repeat interval of the original parity pattern;
        creating an intermediate parity pattern based on the original parity pattern, the intermediate parity pattern indicating parity block assignments among the original disks and the new disk, and storing the intermediate parity pattern in the memory;
        determining a number of parity blocks assigned to each original disk within the intermediate parity pattern;
        determining a total number of disks in the DPDA including the original disks and the new disk;
        calculating a transfer number equal to the number of parity blocks assigned to each original disk within the intermediate parity pattern divided by the total number of disks within the DPDA;

using the data structure to determine a location of parity blocks within the DPDA;

creating a new parity pattern by transferring to the new disk within the intermediate parity pattern a number of parity blocks from each original disk equal to the transfer number; modifying the data structure with the new parity pattern; and redistributing parity blocks within the DPDA to conform to the new parity pattern within the modified data structure.

8. A computer system as defined in claim 7, wherein the processor executes the computer executable code to perform the following additional functions:

creating the intermediate parity pattern based on the original parity pattern by calculating a new repeat interval based on the original repeat interval and the number of disks within the DPDA, including the original disks and the new disk, the intermediate parity pattern large enough to contain information concerning parity block location for a number of stripes equal to the new repeat interval, and populating the intermediate parity pattern with multiples of the original parity pattern.

9. A computer system as defined in claim 8, wherein the processor executes the computer executable code to perform the following additional functions:

calculating a new repeat interval by determining the least common multiple between the original repeat interval and the total number of disks within the DPDA, including the original disks and the new disk.

10. A computer system as defined in claim 9, wherein the DPDA has a dual or higher order parity and the processor executes the computer executable code to perform the following additional functions:

establishing different symbolic identifiers;

assigning the symbolic identifiers to the parity blocks within the intermediate parity pattern so that no stripe within the intermediate parity pattern contains more than one of the same type of symbolic identifier and each original disk contains a substantially equal number of each of the different symbolic identifiers;

selecting one type of symbolic identifier from the different types of symbolic identifiers: and creating a new parity pattern by transferring to the new disk from each original disk within the intermediate parity pattern a number of parity blocks which have been assigned the selected symbolic identifier equal to the transfer number.

11. A method of adding a new data storage device ("disk") to a pre-existing striped parity RAID array composed of original disks, comprising:

determining an original parity pattern of the RAID array which defines a repeated distribution of parity blocks throughout the RAID array across the original disks;

creating a new parity pattern from the original parity pattern by repeating the original parity pattern within the new parity pattern a number of times equal to the least common multiple between the length of the original parity pattern and the number of total disks, including the original disks and the new disk, the new parity pattern defining a repeated distribution of parity blocks throughout the RAID array across the original disks and the new disk;

assigning symbolic identifiers to the parity blocks within the new parity pattern after repeating the original parity pattern within the new parity pattern, there being as many different types of symbolic identifiers as an order of parity of the RAID array, each disk within the new parity pattern being assigned an equal number of each of the different types of symbolic identifiers, each of the parity blocks corresponding to a particular stripe within the new parity pattern being assigned exactly one of each type of symbolic identifier;

selecting one of the different symbolic identifiers;

identifying a select number of parity blocks assigned the selected symbolic identifier from each original disk within the new parity pattern; and redistributing the parity blocks throughout the original disks and the new disk in accordance with the new parity pattern, wherein the redistribution comprises:

moving the identified parity blocks from the original disks to the new disk within the new parity pattern; and balancing the distribution of parity blocks so that the each of the original disks and the new disk has the same number of parity blocks within the new parity pattern, wherein the original parity pattern is repeated within the new parity pattern at least twice before balancing the distribution of parity blocks within the new parity pattern.

12. A method as defined in claim 11, further comprising:

calculating the select number by dividing the number of parity blocks within each original disk of the new parity pattern by the total number of disks, including the original disks and the new disk.

* * * * *